(12) United States Patent
Randjelovic

(10) Patent No.: US 10,444,318 B2
(45) Date of Patent: Oct. 15, 2019

(54) MANAGEMENT OF SYNCHRONISATION WITH A BEACON

(71) Applicant: The Swatch Group Research and Development Ltd, Marin (CH)

(72) Inventor: Zoran Randjelovic, Corcelles (CH)

(73) Assignee: The Swatch Group Research and Development Ltd, Marin (CH)

( * ) Notice: Subject to any disclaimer, the term of this patent is extended or adjusted under 35 U.S.C. 154(b) by 3 days.

(21) Appl. No.: 15/615,075

(22) Filed: Jun. 6, 2017

(65) Prior Publication Data

US 2017/0356977 A1 Dec. 14, 2017

(30) Foreign Application Priority Data

Jun. 10, 2016 (EP) ..................................... 16173992

(51) Int. Cl.
*G01S 1/20* (2006.01)
*G01S 1/02* (2010.01)
(Continued)

(52) U.S. Cl.
CPC ............... *G01S 1/20* (2013.01); *G01S 1/022* (2013.01); *H04B 7/2687* (2013.01); *H04W 52/0216* (2013.01); *H04W 56/001* (2013.01); *H04W 84/18* (2013.01); *Y02D 70/00* (2018.01); *Y02D 70/142* (2018.01); *Y02D 70/144* (2018.01);
(Continued)

(58) Field of Classification Search
CPC . H04W 52/0216; H04W 56/001; G01S 1/022; G01S 1/20; H04B 7/2687
See application file for complete search history.

(56) References Cited

U.S. PATENT DOCUMENTS 5,134,416 A * 7/1992 Cafarelli ................. G01S 1/022
 342/372
5,717,406 A * 2/1998 Sanderford ............. G01S 1/022
 342/363

(Continued)

FOREIGN PATENT DOCUMENTS

WO WO 2016/099682 A1 6/2016

OTHER PUBLICATIONS

European Search Report dated Dec. 2, 2016 in European Application 16173992.5 filed on Jun. 10, 2016 (with English Translation of Categories of cited documents).

*Primary Examiner* — Asad M Nawaz
*Assistant Examiner* — Syed Ali
(74) *Attorney, Agent, or Firm* — Oblon, McClelland, Maier & Neustadt, L.L.P.

(57) ABSTRACT

The present invention relates to a communication assembly comprising a first terminal provided with a first communication module arranged to communicate with a plurality of beacons, each comprising a communication circuit to enable data to be sent and/or received with a particular periodicity. Said assembly additionally comprises a second terminal having a second communication module, wherein said second terminal is arranged to scan its environment by means of said second communication module in order to detect the presence of beacons within range and to retrieve for each beacon detected the particular periodicity and a time offset corresponding to the period between a reference point and the start of the transmission of the message and send them to the first terminal.

9 Claims, 3 Drawing Sheets

(51) Int. Cl.
   *H04B 7/26*    (2006.01)
   *H04W 52/02*   (2009.01)
   *H04W 56/00*   (2009.01)
   *H04W 84/18*   (2009.01)

(52) U.S. Cl.
   CPC .......... *Y02D 70/162* (2018.01); *Y02D 70/166* (2018.01); *Y02D 70/20* (2018.01); *Y02D 70/26* (2018.01); *Y02D 70/449* (2018.01)

(56) References Cited

U.S. PATENT DOCUMENTS

| | | | |
|---|---|---|---|
| 2002/0155845 A1* | 10/2002 | Martorana | G01S 1/022 455/456.1 |
| 2007/0002816 A1* | 1/2007 | Matsunaga | H04B 7/2687 370/338 |
| 2010/0195603 A1* | 8/2010 | Ho | H04B 15/00 370/329 |
| 2013/0076531 A1 | 3/2013 | San Vicente et al. | |
| 2013/0076532 A1 | 3/2013 | San Vicente et al. | |
| 2013/0078912 A1* | 3/2013 | San Vicente | A61B 5/0015 455/39 |
| 2015/0382304 A1 | 12/2015 | Park | |
| 2016/0100444 A1 | 4/2016 | San Vicente et al. | |
| 2016/0100445 A1 | 4/2016 | San Vicente et al. | |
| 2016/0174266 A1 | 6/2016 | Goel et al. | |
| 2016/0183799 A1 | 6/2016 | San Vicente et al. | |
| 2017/0041890 A1* | 2/2017 | Do | H04B 7/2687 |

\* cited by examiner

MANAGEMENT OF SYNCHRONISATION WITH A BEACON

This application claims priority from European Patent Application No. 16173992.5 filed on Jun. 10, 2016; the entire disclosure of which is incorporated herein by reference.

TECHNICAL FILED

The present invention relates to a communication assembly comprising a first terminal (a watch) provided with a first communication module arranged to communicate with a plurality of beacons, each comprising a transmitter for sending information, wherein each transmitter is configured to send data according to a particular periodicity during a particular time interval.

PRIOR ART

The development of connected units has enabled the development of environments, in which these connected units are used. These environments consist in proposing to send information via beacons, for example. These beacons consist of transmitters using a Bluetooth-type protocol to be able to send data. These data can be linked to a sensor to provide temperature or positioning information or to just be used to transmit information relating to advertising, for example.

These beacons, which are supplied with power by a battery or by an energy recovery element such as a solar cell, for example, or by the mains network, are thus information or data transmitters that function as follows. This concerns a transmitter circuit with an antenna connected to a control circuit that allows data to be sent by radio frequency link. Each beacon is configured to send one or more messages containing the information to be circulated. This message is circulated periodically, for example, over three advertising frequencies using the Bluetooth standard. It is then understood that the message is circulated at constant intervals. Since each beacon has its own interval of circulation, these are shifted in relation to one another, generally in a random manner.

To retrieve these data, a portable device such as a telephone or a computer activates its receiver module continuously in order to scan the frequencies to detect the different transmitter beacons and to select at least one of them. The receiver module of the portable device can then target one or more available frequencies of the selected beacon and receive the message sent by said beacon for specific functions.

Nevertheless, this configuration of receipt poses a problem with respect to power consumption. In fact, power consumption is an important criterion for portable electronic devices, since these carry a battery, which entails limited autonomy. Continuous activation of the receiver module, often at maximum sensitivity to detect each active beacon as early as possible and receive the message of this beacon, has an impact on the autonomy of said portable electronic device. This criterion of power consumption is all the more critical for portable electronic devices such as watches or other devices worn on the wrist, as these have more significant limitations in terms of power consumption.

SUMMARY OF THE INVENTION

Therefore, the present invention seeks to remedy the disadvantages of the prior art by providing a method, which optimises power consumption to synchronize a portable device, the autonomy of which is critical, with a beacon.

For this, the invention relates to a communication assembly comprising a first terminal provided with a first communication module arranged to communicate with a plurality of beacons, each comprising a communication circuit to enable data to be sent and/or received with a particular periodicity, wherein said assembly additionally comprises a second terminal having a second communication module, wherein said second terminal is arranged to scan its environment by means of said second communication module in order to detect the presence of beacons within range and to retrieve for each beacon detected the particular periodicity and a time offset corresponding to the period between a reference point and the start of the transmission of the message and send them to the first terminal, and wherein said first terminal is arranged to select at least one of the detected beacons and activate said first communication module synchronously with the chosen beacon using its particular periodicity and its time offset to retrieve the information from this beacon.

This invention has the advantage of limiting the power consumption of the main terminal by default by only monitoring the secondary terminal at fixed short intervals and using this secondary terminal, for which the power consumption is less critical. This secondary terminal is used for the preliminary steps of detection of the beacons and frequency and time interval parameters of each beacon, wherein the main terminal simply has to select a beacon from those supplied by the secondary terminal and synchronise with it.

In an advantageous embodiment, said first terminal is a watch and said second terminal is chosen from the list comprising: computer, electronic tablet, mobile telephone or any other similar gateway made available in public places (stations, airports, shopping centres etc.) and providing this type of service catalogue.

In another advantageous embodiment, said first terminal additionally comprises display devices to display data sent by the second terminal and control devices to select the desired beacon from those detected by the secondary terminal.

The invention additionally relates to a method for operating a communication assembly comprising a first terminal provided with a first communication module arranged to communicate with a plurality of beacons, each comprising a communication circuit to enable data to be sent and/or received with a particular periodicity, a second terminal comprising a second communication module, wherein said method comprises the following steps:

provide the second terminal and activate the second communication module;

scan the environment with the second communication module of the second terminal in order to detect the beacons within range and to retrieve for each beacon periodicity information and information regarding the time offset in relation to a defined instant, and indeed identification of the type of beacon and its function (advertising, temperature . . . );

send, for each beacon, said periodicity information and said information regarding the time offset in relation to a defined instant, indeed identifying it and the function of the beacon; and in the first terminal select at least one beacon and configure and activate the first communication module of said first terminal in order to synchronize it to the periodicity of the selected beacon and to monitor said beacon.

In a first advantageous embodiment, the step of information retrieval is performed by calculation during monitoring.

In a second advantageous embodiment, the step of information retrieval is performed by sending a request.

In a third advantageous embodiment, the step of selecting the beacon is performed automatically on the basis of existing parameters in the first or the second terminal.

In a fourth advantageous embodiment, the step of selecting the beacon is performed by displaying the list of beacons detected on display devices of the first terminal and by enabling the user to make the selection via the control devices of the first terminal.

In a fifth advantageous embodiment, the selection step allows the selection of at least two beacons and in that, between the selection and the adequate activation of the first communication module, said method additionally comprises a management step determining the monitoring order of the beacons by conducting calculations made from offset and periodicity durations of the selected beacons.

In another advantageous embodiment, said first terminal is a watch and in that said second terminal is chosen from the list comprising: computer, electronic tablet, mobile telephone or any other similar gateway made available in public places (stations, airports, shopping centres etc.) and providing this type of service catalogue.

BRIEF DESCRIPTION OF THE DRAWINGS

The aims, advantages and features of the device according to the present invention will become clearer from the following detailed description of at least one embodiment of the invention given solely as a non-restrictive example illustrated by the attached drawings, wherein.

DETAILED DESCRIPTION

Figure 1:
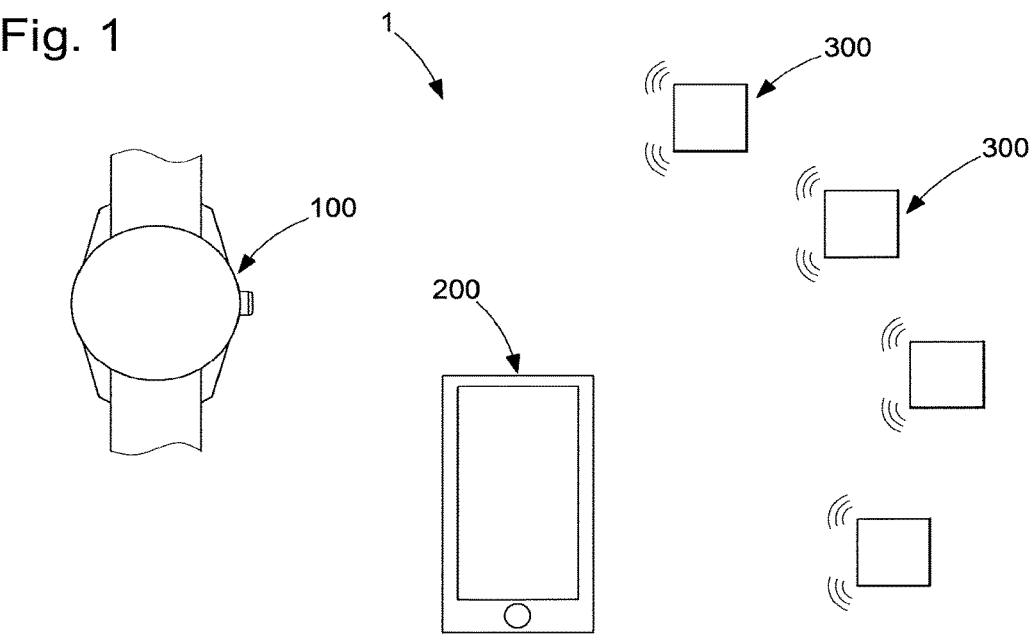
FIGS. 1 and 2 schematically show a communication assembly according to the invention.
Figure 2:
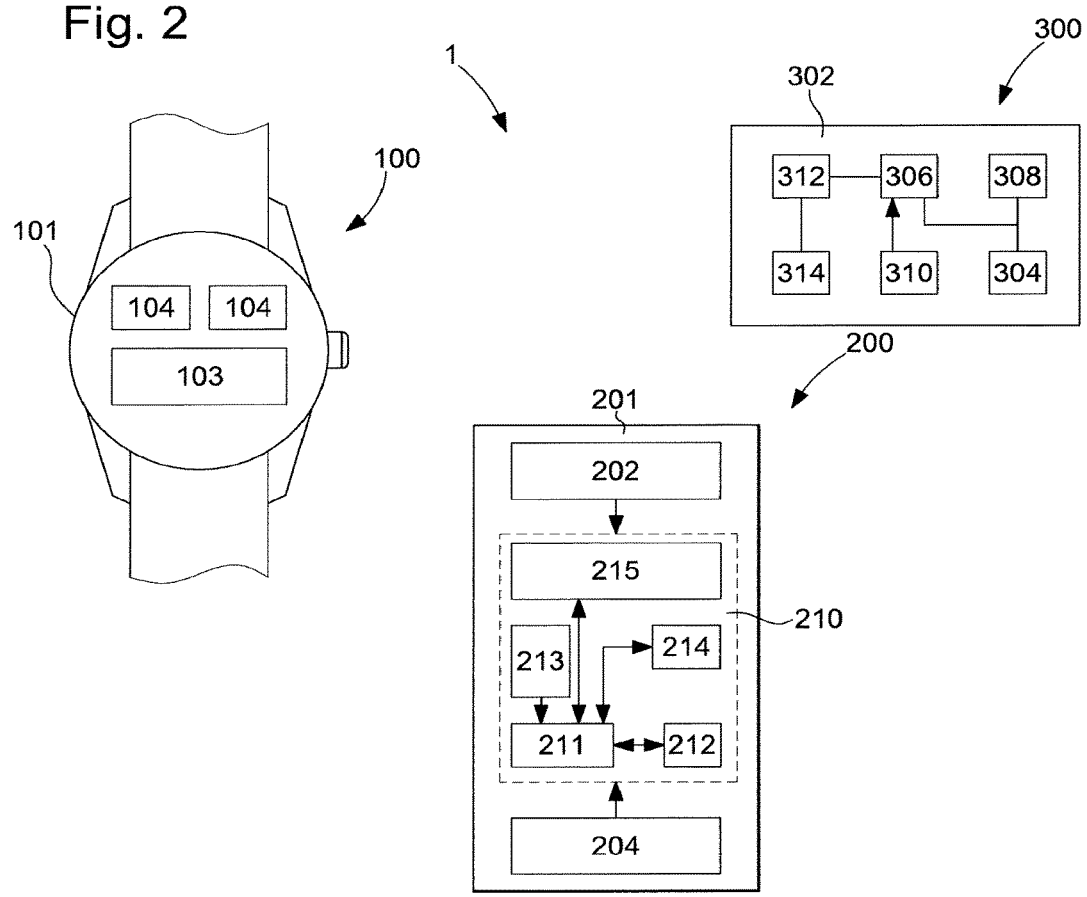

An assembly 1 according to the invention is shown in FIG. 1. Such an assembly comprises a plurality of beacons 300. Each beacon 300 is configured in the form of a case 302, in which an electronic device is positioned. This electronic device is fed by a supply unit 304. This supply unit 304 can be a battery or an accumulator or an autonomous unit such as a solar cell. The advantage of such an autonomous unit is that it is independent with respect to energy. An alternative is a direct supply from the electricity network if available.

The electronic device has a calculation unit or microcontroller 306 connected to a memory unit 308. This memory unit 308 serves to store data and can be a non-volatile memory using flash technology (NOR, NAND).

The electronic device also has a clock circuit 310 for timing the beacon 300 and as precise time base for logging and sending data.

The electronic device also has a communication circuit 312 comprising at least one antenna 314 to communicate with the outside. This communication circuit 312 additionally allows data to be sent (and/or received) to dedicated devices 100 such as mobile telephones, tablets, computers or watches, for example.

To communicate, each beacon 300 is configured to send a message Mi, i.e. data. This message Mi is transmitted according to a first protocol that may be, for example, a Bluetooth, NFC, Wi-Fi, ZigBee or other protocol. This message Mi is circulated with one or more particular frequencies Fi and with a particular periodicity Pi so that the message Mi is repeated.

The assembly 1 also comprises at least one first terminal 100. This first terminal is preferably a watch or a wristband or an item of jewellery. This first terminal comprises a case 101, to which a wristband 102 is attached. This case comprises an electronic module 103 fed via a supply unit and comprising a control unit such as a microcontroller connected to at least memory devices, display devices 104 to display information and a first communication module 105 capable of sending and receiving data. The first communication module 105 is configured to be able to communicate with the communication circuit 312 of the beacons 300.

The invention proposes to synchronize the first terminal 100 with at least one of the beacons 300 so that said first terminal 100 can receive data Mi from this beacon 300.

For this, the invention cleverly proposes to use a second terminal 200. This second terminal 200 is an electronic device such as a telephone or computer or tablet or any other device such as a gateway made available in public places (stations, airports, shopping centres etc.) and providing this type of service catalogue. This second terminal comprises a case 201, in which a second electronic module 210 is arranged. This second electronic module 210 is connected to display devices 202 and fed by a supply 204. The second electronic module 210 comprises a calculation unit 211 connected to memory devices 212, control devices 213, sensors 214 as well as a second communication module 215. This second communication module 215 is capable of using communication protocols such as Bluetooth, GSM, Wi-Fi or also ZigBee.

This second terminal 200 is used as intermediate means to conduct the detection operation and draw up a list of beacons nearby. To do this, the second terminal 200 is used so that its second communication module 215 is set in operation and uses at least one communication protocol that allows it to communicate with the first terminal 100 and the beacons 300.

The operation of the second communication module 215 of the second terminal 200 is as follows. A first step consists of using the second communication module in order to conduct a scan. This scan is conducted using the common protocol between the second terminal 200 and the plurality of beacons 300. This scan enables the beacons 300 located in range to be identified.

Once these beacons 300 have been detected, a second step consists of collecting information. For this, the second terminal 200 switches to receive mode in order to retrieve for each beacon 300 its identifier and possibly some of its properties (type of beacon, type of information available, available protocols . . . ). This monitoring window of the second terminal 200 also enables transmission information to be retrieved for each beacon. In fact, each beacon 300 has its particular periodicity Pi. These items of information are retrieved by the second terminal 200. To obtain this periodicity information, the second terminal 200 can analyse the transmission of each beacon to calculate these data or then send a request to retrieve the information. The analysis of each beacon 300 consists of monitoring each beacon over a predefined time lapse in order to be able to measure the particular periodicity Pi, obtain certain additional information, if available, as well as the duration of the message M.

Once at least the periodicity information and information of the time offset in relation to a defined instant have been retrieved for each beacon 300, the second terminal 200 compiles these in order to make a list or a catalogue that it is going to send via the second communication module 215 to the first terminal 100, which monitors at regular and optimised intervals if a message of terminal 200, which is often very close to terminal 100, arrives.

The first terminal 100 then becomes capable of selecting at least one beacon 300. For this, the selection of the beacon on the list can be manual or automatic. For a manual choice, this list is displayed on the display devices of the first terminal so that by means of the control devices the user can get to know the different beacons in the surroundings and select one of them. In the case of an automatic selection, this selection could be performed on the basis of criteria such as favourites, type of information desired, the available protocol or a selection frequency.

Figure 3:
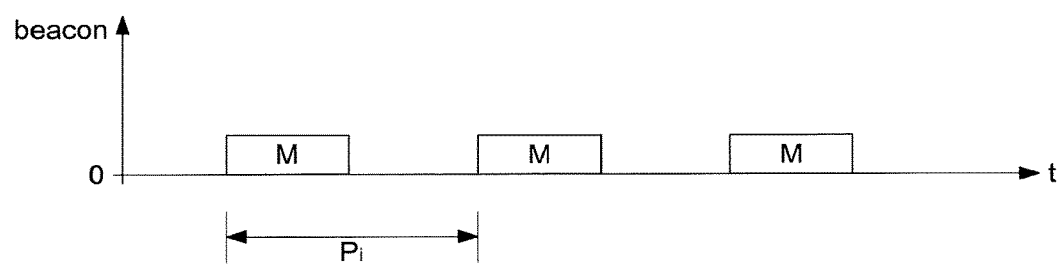
FIGS. 3 to 5 schematically show flow charts of the communication assembly according to the invention.

Once the beacon has been selected, the first terminal can switch to monitoring mode to retrieve the message sent by the beacon. Cleverly, the first terminal uses data relating to the beacon that have been provided by the second terminal to optimise the power consumption and only monitors when it is necessary and for the time necessary to obtain the entire message Mi. In fact, the periodicity information Pi allows the first terminal to activate the monitoring, i.e. receive, mode of the first communication module only as needed. For this, another item of information is supplied by the second terminal 200 and this other information is a time shift duration Di or offset. This time shift duration Di corresponds to the period between a defined reference time point and the start of transmission of the message by the beacon. The illustration of FIG. 3 shows a time graph of the data transmission of a beacon 300. It is evident that this beacon periodically sends a message M. However, having the periodicity Pi is not sufficient to obtain synchronisation between the first terminal 100 and the beacon 300. For this, it is necessary to have the time shift duration Di, which enables the time from a defined/given instant t0 that remains before the next message M is sent to be known.

Figure 4:
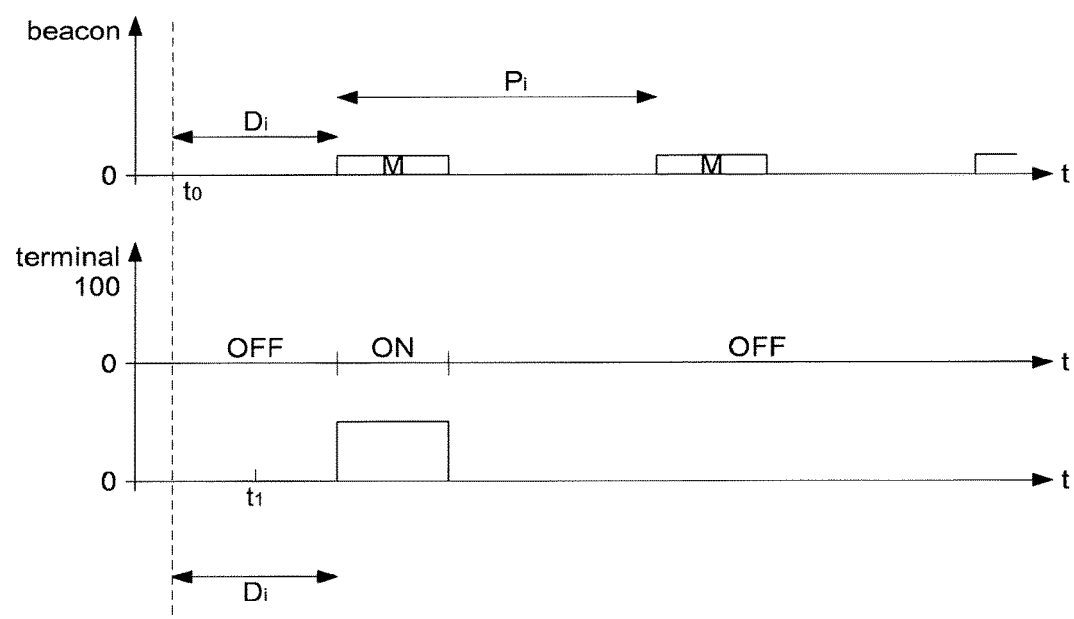

Consequently, when the first terminal 100 switches to data receive mode, it is going to use the time shift duration Di, as shown in FIG. 4, from an instant t1 and in relation to the given/defined instant to. Consequently, the first terminal 100 will be able to activate its first communication module 105 in receive mode ON over the exact time lapse, during which the beacon sends the message M. This synchronisation configuration advantageously allows the operating time of the first communication module to be limited and therefore the power consumption to be limited.

In a variant, it is conceivable that the first terminal 100 can receive messages from several beacons 300. In this case, the first terminal 100 retrieves the information of each beacon 300 that has been retrieved via the second terminal 200. This information is compiled in order to define a monitoring and receiving sequence. In fact, each beacon has its own periodicity Pi and its own time shift duration Di in relation to a given/defined instant. In this way, it becomes necessary to perform a management step by performing calculations in order to determine which of the beacons should be monitored first. These calculations are made from the time shift durations and periodicities.

Figure 5:
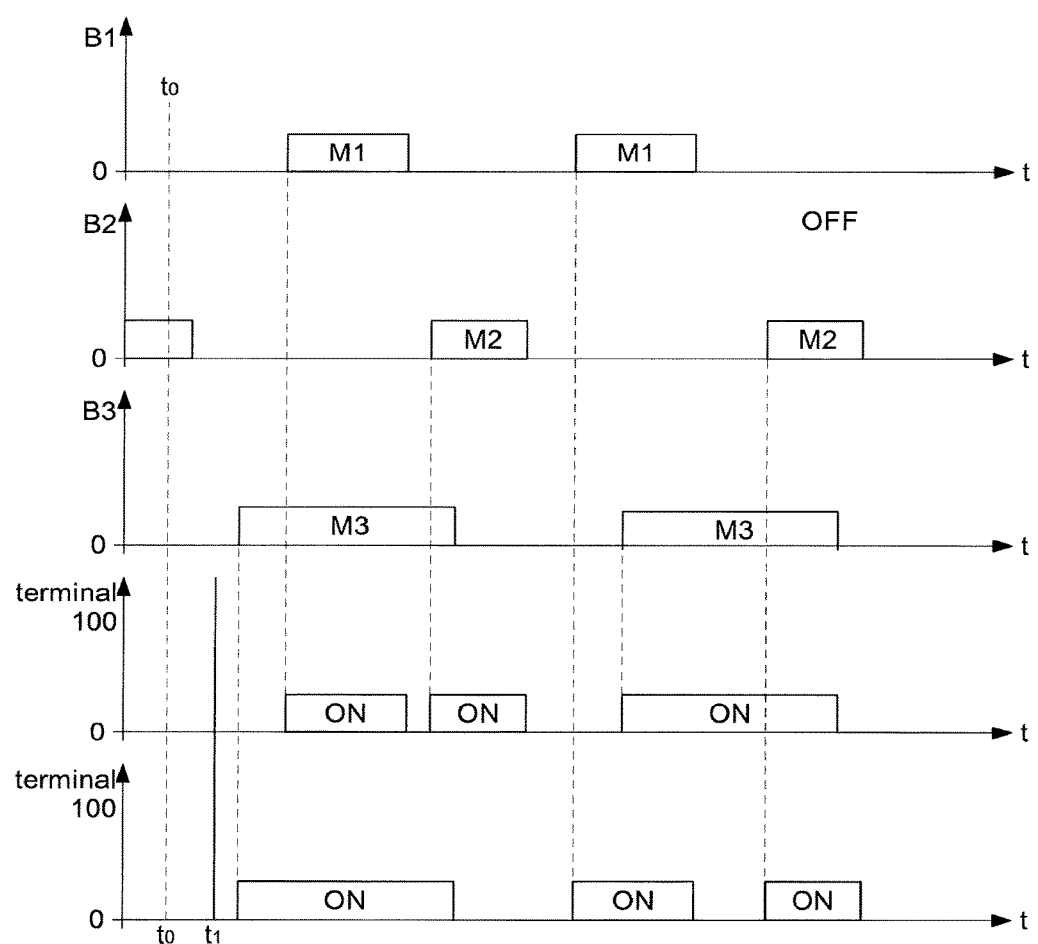

Hence, the example of FIG. 5, in which the time graphs of different beacons B1, B2, and B3 are shown. Beacon B1 sends a message M1 with a periodicity P1, beacon B2 sends a message M2 with a periodicity P2 and beacon B3 sends a message M3 with a periodicity P3. It is evident in this FIG. 5 that the periodicities P1, P2 and P3 are different from one another and that the sizes of the messages M1, M2 and M3 are different. Hence, it becomes necessary to manage these beacons to be able to monitor the messages of these beacons in order to limit the power necessary to retrieve all the messages. In the configuration shown in FIG. 5, it is evident that from the instant t0, it is possible to monitor the messages of the different beacons in the following order: message M1, then message M2 and then message M3. A variant of monitoring order can be message M3, then message M1 and then message M2.

In the case of conflict, i.e. of messages Mi that are circulated at the same time, the electronic module 103 of the first terminal 100 is capable of skipping the monitoring of these messages Mi.

It will be understood that various modifications and/or improvements and/or combinations evident to a person skilled in the art can be applied to the different embodiments of the invention outlined above without departing from the framework of the invention defined by the attached claims.

What is claimed is:

1. A communication assembly comprising:
   a first terminal provided with a first communication module to communicate with a plurality of beacons, each of the plurality of beacons comprising a communication circuit to send and/or receive data with a particular periodicity; and
   a second terminal having a second communication module, wherein said second terminal detects the presence of the plurality of beacons within range of said second terminal,
   wherein said second terminal retrieves, for each of the plurality of the detected beacons, the particular periodicity and a time offset, and said second terminal sends the particular periodicity and the time offset of the plurality of the detected beacons to said first terminal,
   wherein the time offset corresponds to a period between a reference point and a start of a transmission of a message from each of the plurality of the detected beacons,
   wherein said first terminal is configured to select at least one of the plurality of the detected beacons and activate said first communication module synchronously with the selected beacon based on the particular periodicity and the time offset of the selected beacon received from said second terminal, to receive the message from the selected beacon,
   wherein the second terminal having the second communication module retrieves the particular periodicity and the time offset by measurement of the transmission of the message by each of the plurality of the detected beacons over a predefined scan time, and
   wherein the particular periodicity and time offset are determined while the selected beacon is monitored.

2. The communication assembly according to claim 1, wherein said first terminal is a watch, and wherein said second terminal is one of a computer, electronic tablet, mobile telephone or a gateway device to collect beacon data.

3. The communication assembly according to claim 1, wherein said first terminal includes display devices to display data sent by said second terminal and control devices to select a desired beacon from those detected by said second terminal.

4. A method for operating a communication assembly comprising a first terminal provided with a first communication module to communicate with a plurality of beacons, each of the plurality of beacons comprising a communication circuit to send and/or receive data with a particular periodicity, and a second terminal comprising a second communication module, said method comprising:

- detecting, by the second terminal, the plurality of beacons within range of the second terminal;
- retrieving, by the second terminal, periodicity information and time offset information regarding a time offset for each of the plurality of the detected beacons;
- sending, from the second terminal to the first terminal, said periodicity information and said time offset information regarding the time offset for each of the plurality of the detected beacons; and
- in the first terminal, selecting the at least one of the plurality of the detected beacons received from said second terminal and then activating the first communication module of the first terminal synchronously with the particular periodicity of the selected beacon to monitor the selected beacon;
- wherein the second terminal having the second communication module retrieves the particular periodicity and the time offset by measurement of the transmission of the message by each of the plurality of the detected beacons over a predefined scan time, and
- wherein the retrieving of the periodicity information and time offset information is determined during the monitoring of the selected beacon.

5. The method according to claim 4, wherein the retrieving of the periodicity information and time offset information is via a sent request.

6. The method according to claim 4, wherein the selecting of the at least one beacon is based on existing selection parameters in the first or the second terminal.

7. The method according to claim 4, wherein the selecting of the at least one beacon includes presenting a list of the plurality of the detected beacons on the first terminal and selecting the at least one beacon by a user via the control devices of the first terminal from the list.

8. The method according to claim 4, wherein the selecting of the at least one beacon comprises selection of at least two beacons, and wherein said method further comprises managing of the plurality of beacons by determining a monitoring order of the plurality of beacons based on the time offset and periodicity durations of each of the selected beacons.

9. The method according to claim 4, wherein said first terminal is a watch, and wherein said second terminal is one of a computer, electronic tablet, mobile telephone or a gateway device to collect beacon data.

* * * * *